(12) United States Patent
Darby et al.

(10) Patent No.: US 8,906,576 B2
(45) Date of Patent: Dec. 9, 2014

(54) MATERIAL ENGINEERING FOR HIGH PERFORMANCE LI-ION BATTERY ELECTRODES

(75) Inventors: Blake L. Darby, Gainesville, FL (US); Ludovic Godet, Boston, MA (US); Xianfeng Lu, Beverly, MA (US); Tristan Yonghui Ma, Lexington, MA (US)

(73) Assignee: Varian Semiconductor Equipment Associates, Inc.

( * ) Notice: Subject to any disclaimer, the term of this patent is extended or adjusted under 35 U.S.C. 154(b) by 10 days.

(21) Appl. No.: 13/357,647

(22) Filed: Jan. 25, 2012

(65) Prior Publication Data

US 2013/0189579 A1    Jul. 25, 2013

(51) Int. Cl.
  *H01M 8/22*   (2006.01)
  *H01M 4/04*   (2006.01)

(52) U.S. Cl.
  CPC . *H01M 4/04* (2013.01); *Y02E 60/12* (2013.01)
  USPC ........... 429/505; 429/482; 429/484; 429/490; 429/502

(58) Field of Classification Search
  CPC ....... H01M 4/04; H01M 4/0428; Y02E 60/12
  USPC .................. 429/221, 246, 224, 231.3, 231.1; 427/577; 216/13
  See application file for complete search history.

(56) References Cited

U.S. PATENT DOCUMENTS

| 2004/0018416 | A1* | 1/2004 | Choi et al. ....................... 429/44 |
| 2006/0154147 | A1* | 7/2006 | Kurihara et al. ........... 429/231.8 |
| 2007/0145352 | A1* | 6/2007 | Kasama et al. ................. 257/40 |
| 2008/0206484 | A1* | 8/2008 | Kostecki et al. .............. 427/575 |
| 2011/0223546 | A1* | 9/2011 | Godet et al. .................. 430/325 |
| 2012/0289030 | A1  | 11/2012 | Godet et al. |

FOREIGN PATENT DOCUMENTS

| EP | 2131422 A1 | 12/2009 |
| WO | 2010/138619 A2 | 12/2010 |

OTHER PUBLICATIONS

Arie, et al., "Effect of boron doped fullerene C60 film coating on the electrochemical characteristics of silicon thin film anodes for lithium secondary batteries," Synthetic Metals, Vo. 161, No. 1-2, Jan. 1, 2011, p. 158-165.
Nakajima, et al., "Surface structures and electrochemical characteristics of surface-modified carbon anodes for lithium ion battery," Solid State Sciences., vol. 9, No. 9, Sep. 1, 2007, p. 777-784.
International Search Report and Written Opinion dated May 6, 2013, for corresponding PCT/US2013/020640 filed Jan. 8, 2013.

* cited by examiner

*Primary Examiner* — Gary Harris

(57) ABSTRACT

A method of treating an electrode for a battery to enhance its performance is disclosed. By depositing a layer of porous carbon onto the electrode, its charging and discharging characteristics, as well as chemical stability may be improved. The method includes creating a plasma that includes carbon and attracting the plasma toward the electrode, such as by biasing a platen on which the electrode is disposed. In some embodiments, an etching process is also performed on the deposited porous carbon to increase its surface area. The electrode may also be exposed to a hydrophilic treatment to improve its interaction with the electrolyte. In addition, a battery which includes at least one electrode treated according to this process is disclosed.

18 Claims, 14 Drawing Sheets

MATERIAL ENGINEERING FOR HIGH PERFORMANCE LI-ION BATTERY ELECTRODES

FIELD

This invention relates to fabrication of high performance lithium ion battery electrodes, and more particularly, deposition of porous carbon on electrode materials to achieve high performance.

BACKGROUND

In today's environment, more and more devices are becoming battery powered, such as mobile phones, computers and even automobiles. Consequently, longer battery life is being demanded for all of these devices. One source of extended battery life has been the use of lithium ion based battery cells.

Lithium ion batteries are comprised of three major components, an anode 10, an electrolyte 20, and a cathode 30, as seen in FIG. 1. Currently, performance of the battery is limited by the cathode 30, which means that the gravimetric capacity (as measured in mAh/g) of the cathode 30 is significantly lower than that of the anode 10. In order for cathode technology to match the capacity of new anode materials, such as silicon, the cathode 30 must have a high capacity and be able to withstand high cycle rates. A significant amount of research is being focused on increasing the performance of cathodes 30 for high energy and high power applications.

The main cathode materials in today's lithium ion batteries are $LiCoO_2$, $LiMn_2O_4$, and $LiFePO_4$. Each class of materials has its own set of advantages and disadvantages, which make them each valuable to different applications. For example, $LiCoO_2$ has revolutionized lithium ion batteries for portable electronics like laptops and cell phones, while cheaper materials like $LiMn_2O_4$ and $LiFePO_4$ dominate the market for electric vehicles.

The main anode material in commercial lithium ion batteries is graphitized carbon. While alternative materials, such as silicon, provide much higher capacity, problems such as volume expansion and unstable solid electrolyte interphase reactions, need to be solved before commercialization is possible.

Any improvement which increases the capacity, rate capability, or stability of the cathode or anode will subsequently increase battery life and cycling rate. Therefore, a system and apparatus which enhances these characteristics of the electrode would be beneficial.

SUMMARY

A method of treating an electrode for a battery to enhance its performance is disclosed. By depositing a layer of porous carbon onto the electrode, its charging and discharging characteristics may be improved. The method includes creating a plasma using a carbon based molecule, such as $C_xH_y$, $C_xB_yH_z$, $C_xP_yH_z$, $C_xN_yH_z$ and others and attracting the plasma toward the electrode, such as by biasing a platen on which the electrode is disposed. In some embodiments, an etching process is also performed on the deposited porous carbon to increase its surface area. The electrode may also be exposed to a hydrophilic treatment to improve its interaction with the electrolyte. In addition, a battery which includes at least one electrode treated according to this process is disclosed.

BRIEF DESCRIPTION OF THE DRAWINGS

For a better understanding of the present disclosure, reference is made to the accompanying drawings, which are incorporated herein by reference and in which.

DETAILED DESCRIPTION

One method to increase capacity and rate capabilities of the cathode 30 involves coating the surface with a thin carbon layer, which improves its electrical conduction and protects the bulk cathode material from reacting with the electrolyte. This type of approach may be applied to all cathode materials (such as $LiCoO_2$, $LiMn_2O_4$, and $LiFePO_4$) with beneficial results.

$LiCoO_2$ has the highest capacity of any cathode material with 230 mAh/g. It also has very high electronic and $Li^+$ conductivity, leading to excellent rate capabilities. Some of the major problems with $LiCoO_2$ cathodes are their high cost and unstable reactions with the electrolyte, leading to the dissolution of Co and safety concerns. This eventually leads to capacity fade and poor cycling behavior.

Figure 1:
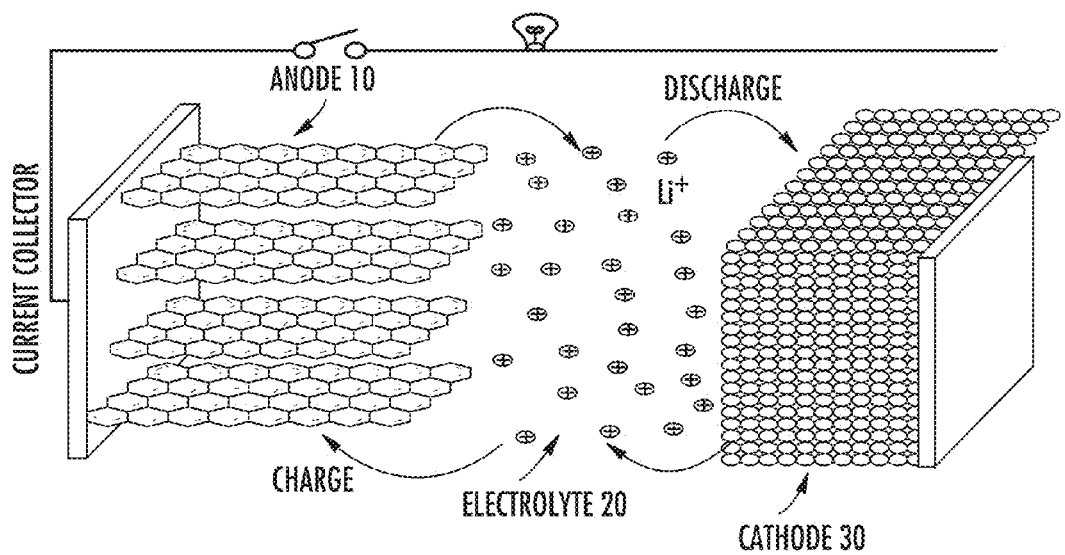
FIG. 1 is an example of a lithium ion battery according to the prior art.
Figure 2B:
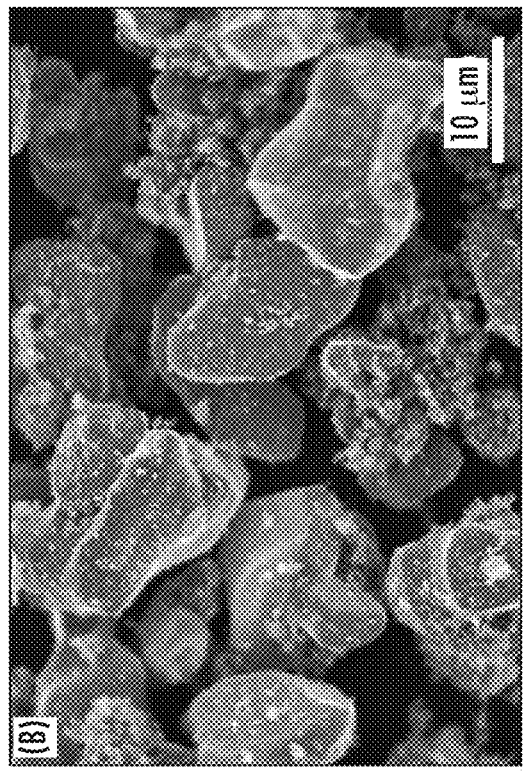
FIG. 2A-B show SEM images of uncoated and coated $LiCoO_2$, respectively.
Figure 2A:
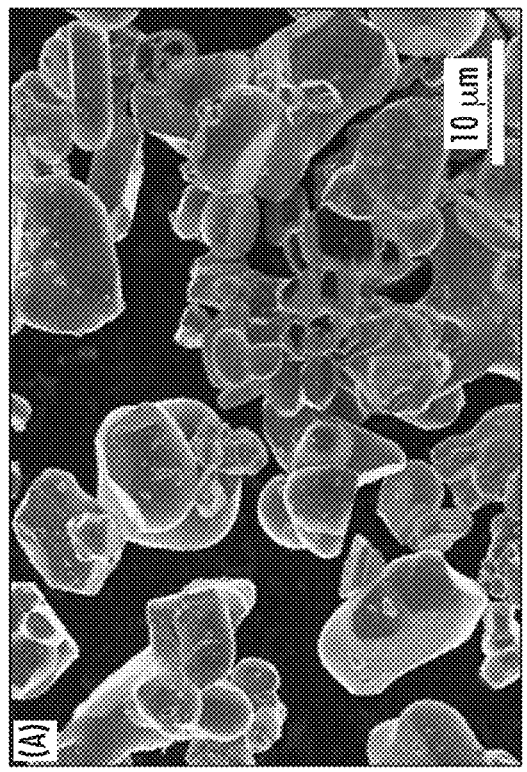

FIG. 2A shows an SEM image of base $LiCoO_2$ particles having an average size of roughly 10 μm. FIG. 2B shows an SEM image of $LiCoO_2$ particles coated with carbon black by a solution based process. Carbon coatings for $LiCoO_2$ compounds enhance a variety of properties. For example, decreased contact resistance and increased lithium ion diffusivity through to the bulk cathode may be achieved.

Figure 3A:
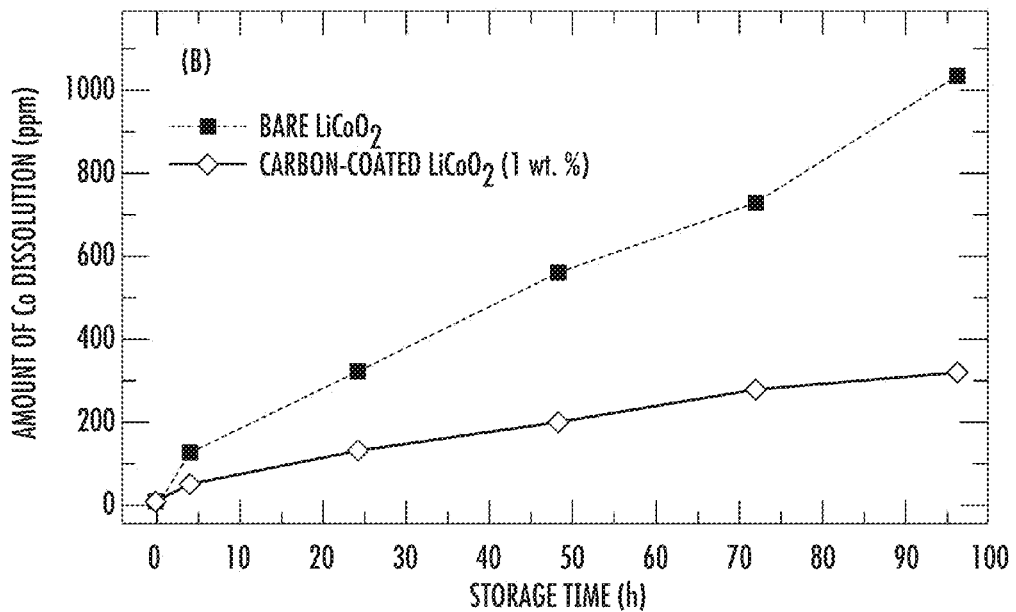
FIG. 3A-B show graphs representing Co dissolution and charge capacity, respectively.
Figure 3B:
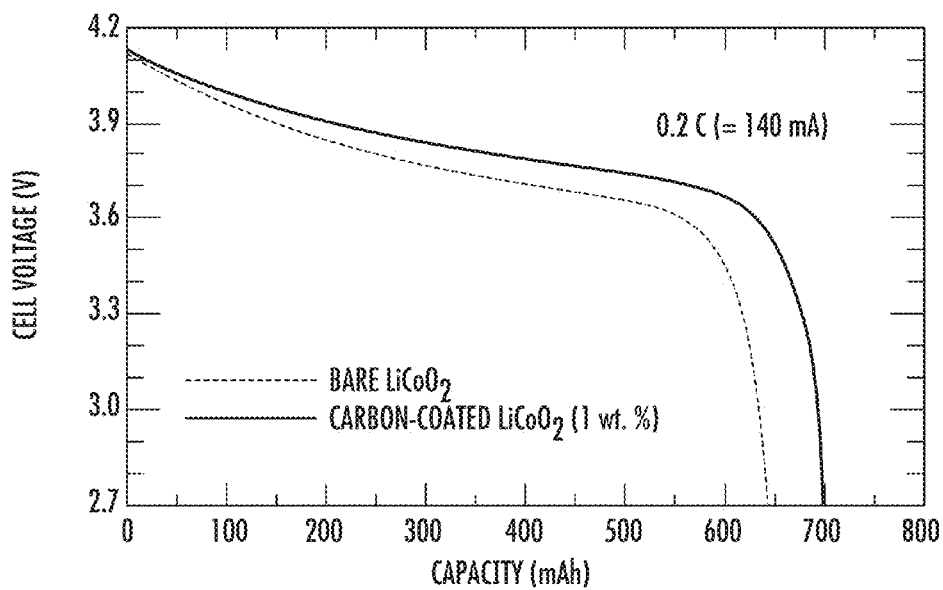

One of the major problems with $LiCoO_2$ cathodes is cobalt (Co) dissolution into the electrolyte at elevated temperatures, leading to cell swelling and capacity fade. Carbon coated $LiCoO_2$ cathodes show decreased dissolution, as seen in FIG. 3A. Specifically, at 85° C., bare $LiCoO_2$ cathodes experience Co dissolution of approximately 1000 ppm after 100 hours of storage. In contrast, carbon coated $LiCoO_2$ cathodes, at the same temperature, experience Co dissolution of only 300 ppm after the same amount of time. It is believed that the carbon coating may prevent electrolyte decomposition and the accompanying gas evolution at the cathode/electrolyte interface. The electrochemical result of this improvement is shown in FIG. 3B, where the discharge curves for the carbon coated sample results in nearly a 10% increase in capacity despite the added mass from the 1 wt % carbon coating. Thus, carbon coating appears to enhance the performance of $LiCoO_2$ cathodes.

$LiMn_2O_4$ is a second cathode material. This material may be promising because it is inexpensive, widely available, and environmentally benign. It has excellent rate capability with a theoretical capacity around 150 mAh/g. However, this material suffers immense capacity fade at elevated temperatures (above 55° C.). It is believed that at increased temperatures, the manganese (Mn) reacts with the electrolyte and corrodes. Carbon coatings have been shown to increase the electrochemical stability of $LiMn_2O_4$ structures by reducing corrosion.

Figure 4A:
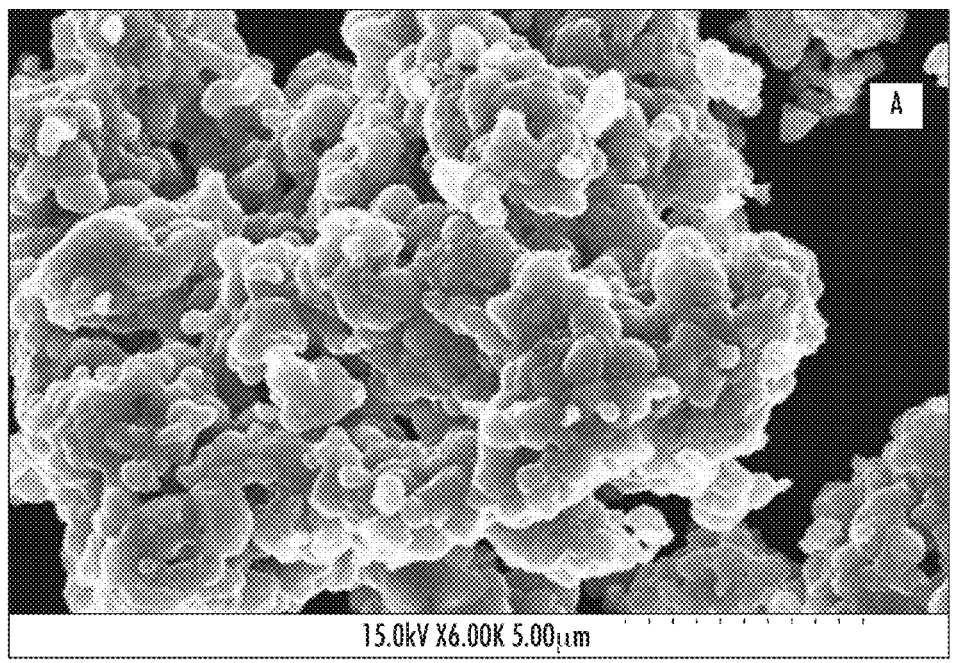
FIG. 4A shows an SEM image of carbon coated $LiMn_2O_4$.

FIG. 4A shows an SEM image of $LiMn_2O_4$ particle agglomerates coated with a carbon xerogel. Individual particles are around 40 nm. These particles bind together during processing to form agglomerates having a size which is on the order of tens of microns.

Figure 4B:
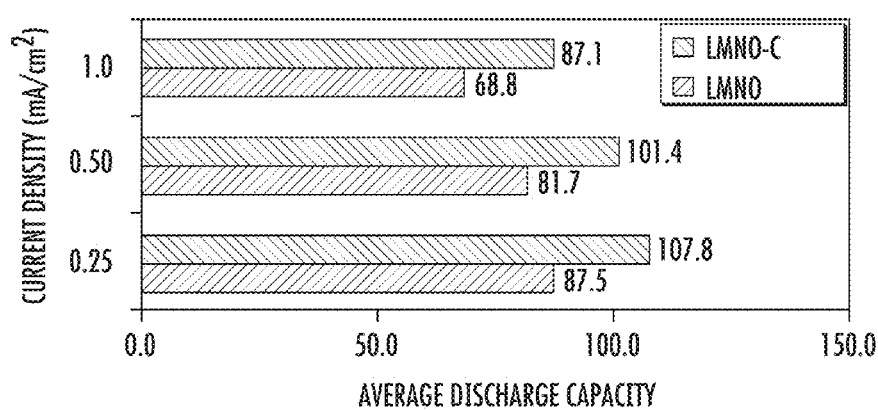
FIG. 4B is a chart showing the average discharge capacities for bare and carbon coated $LiMn_2O_4$ cathodes for a variety of current densities.

FIG. 4B shows the discharge capacities averaged over 50 cycles for the coated and uncoated $LiMn_2O_4$. It is believed that the uncoated $LiMn_2O_4$ particles react with trace amounts of HF contained in the electrolyte, leading to capacity fade. It is possible that the carbon coating acts as a protective coating against the HF, thus preventing the dissolution of the cathode. The carbon coating also allows the cell to operate at higher voltages without capacity fade by reducing the evolution of oxygen from the cathode. This ultimately makes the battery more resistant to overcharge and overdischarge.

A third cathode material, $LiFePO_4$, has several advantages because it is low cost, environmentally friendly, and has comparable capacity of 170 mAh/g. $LiFePO_4$ is also more resistant to overcharge and overdischarge than other cathode materials. However, poor electronic conductivity has prevented this material from entering the high cycle rate market. $LiFePO_4$ has an electrical conductivity of $10^{-9}$ S/cm versus $10^{-3}$ S/cm for $LiCoO_2$. This low conductivity translates into poor rate performance for this chemistry because a high conductivity is needed to reduce the $Fe^{+3}$ upon discharge.

Figure 5A:
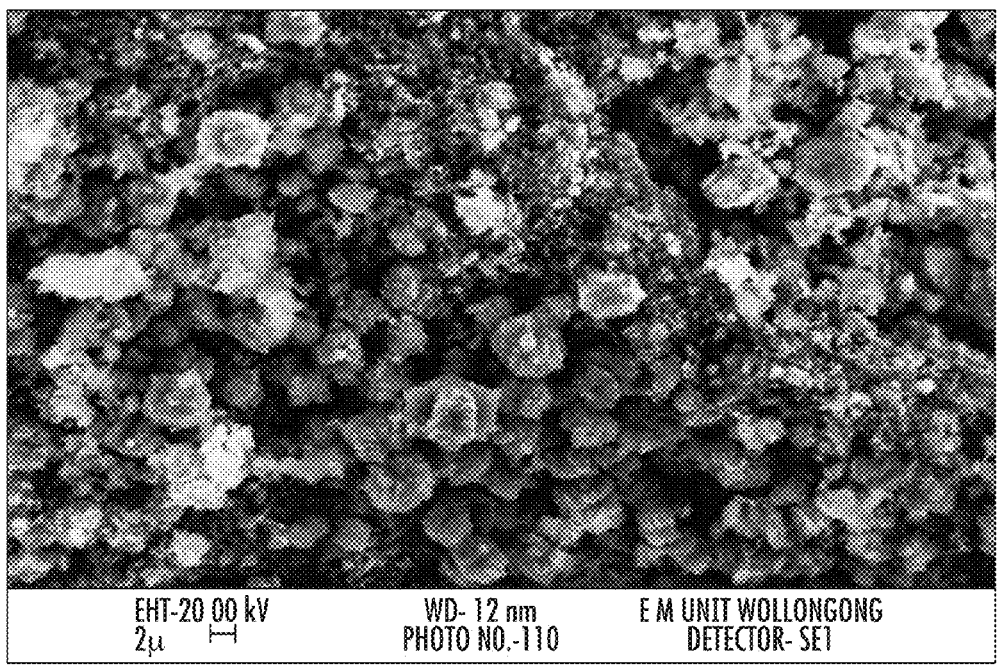
FIG. 5A shows an SEM image of carbon coated $LiFePO_4$.

FIG. 5A shows an SEM image of 1 μm size particles of $LiFePO_4$ coated with carbon using a sol-gel process at 750° C. The process results in a fibrous coating of carbon that not only has a high surface area, but is also highly conductive.

Figure 5B:
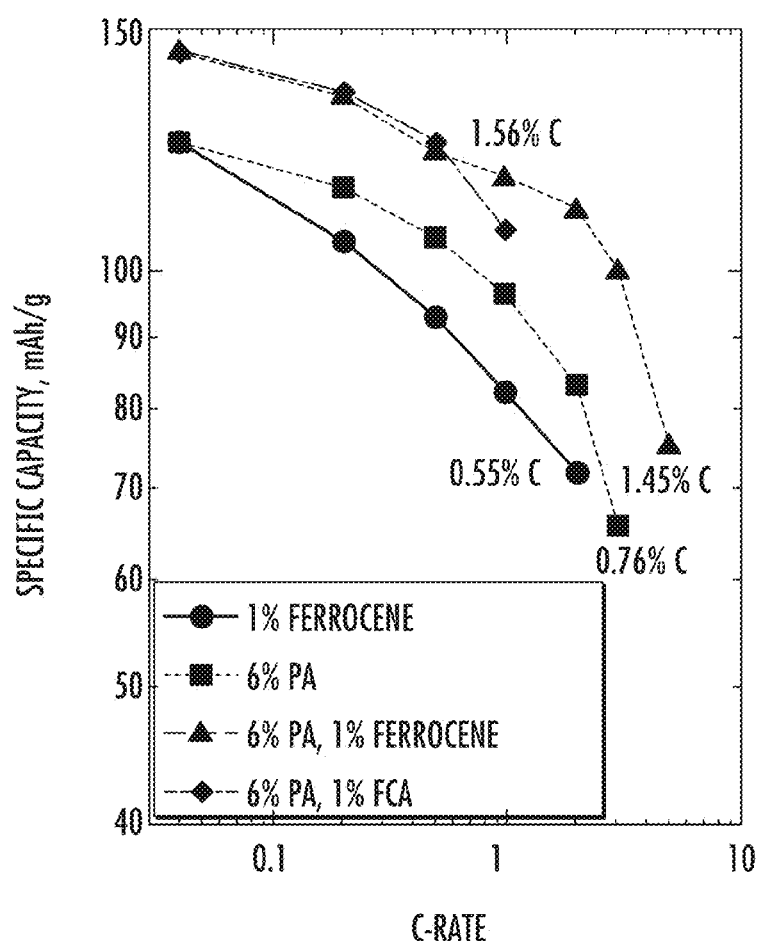
FIG. 5B is a graph showing specific capacities as a function of discharge rate and percent carbon composition for lithium cells with $LiFePO_4$ cathodes.

FIG. 5B shows the electrochemical rate performances of several $LiFePO_4$ cells containing different amounts and types of carbon. The specific capacity of various compositions is measured as a function of discharge rate. The compositions include a cathode coated with 1% ferrocene, a cathode coated with 6% pyromellitic acid (PA), a cathode coated with 6% PA and 1% ferrocene, and a cathode with 6% PA and 1% ferrocenecarboxylic acid. In other studies, it has been shown that even a 0.7 wt % addition of carbon to $LiFePO_4$ can increase the room temperature conductivity by two orders of magnitude, which results in higher rate capabilities of the battery.

In general, FIG. 5B shows that, for $LiFePO_4$ cells, the higher wt % carbon samples perform better at higher rates, but more important is the nature of the carbon. A higher $sp^2$ bond concentration leads to better electrical conductivity and rate.

In addition to coating the lithium compound for cathodes, it may also be beneficial to coating the anode with a thin layer of carbon. Unlike graphitic anodes, next generation anode materials, such as silicon and germanium, are known to form unstable solid electrolyte interphase (SEI) layers, and may benefit from having a protective layer. This SEI layer is composed of reaction products between the anode and electrolyte and may contribute to an irreversible capacity loss because it consumes $Li^+$ and anode material. Since graphite is known to form a stable SEI layer, it follows that a highly graphitic coating would improve SEI stability for non-carbonaceous anode materials.

Silicon and germanium also suffer volumetric expansion upon lithiation, which may be up to 300%, compared to 10% for that of carbon. Graphitic coatings have been seen to provide a compressive stress on silicon and germanium, which may reduce the effect of the large volume change. As an alternative, creating a SiC or GeC alloy may also reduce cracking and pulverization of these anode materials by taking advantage of the small volumetric expansion of carbon. In addition to the structural stability that carbon provides, carbon coatings and alloys may increase conductivity and lower contact resistance at the electrolyte electrode interface. Highly graphitic carbon is known to have a high electrical conductivity, thus enhancing charge transport for the battery.

Figure 6:
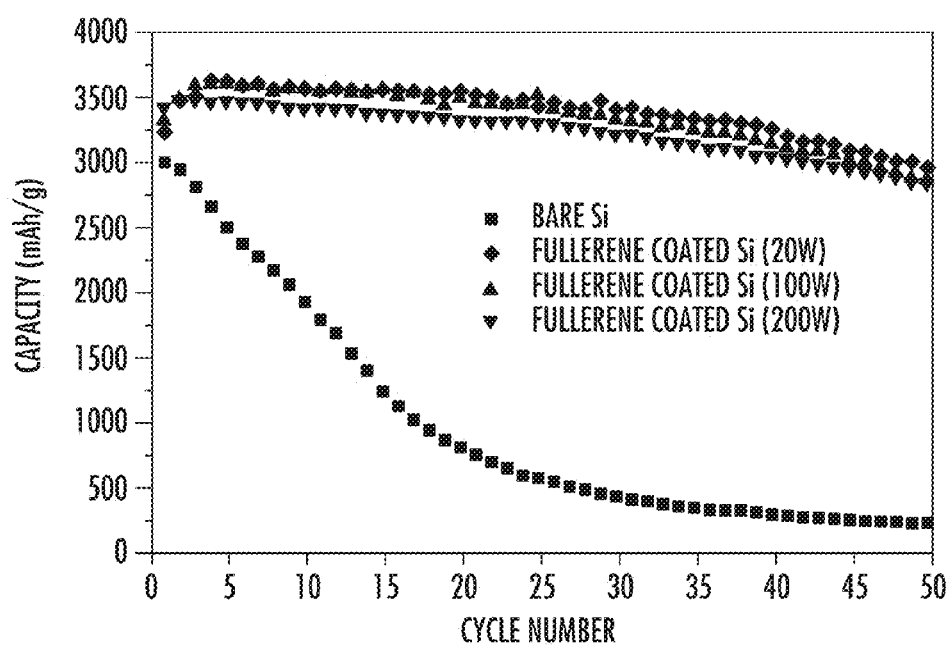
FIG. 6 is a graph showing specific capacities for bare and coated silicon films.

Plasma evaporated carbon films are shown in FIG. 6. It may be shown that the degree of polymerization increased as the plasma power decreased. The stabilizing effect of the fullerene layer increases as the degree of polymerization is increased. The capacity of uncoated thin films declines rapidly, before it stabilizes at a value lower than conventional graphite electrodes.

It is known that the carbon coating must not only be electrically conductive, but must also have adequate permeability for the electrolyte solution. One way to solve this problem is to deposit a porous carbon layer that has a high surface area, but is also highly conductive. Thus, new methods to deposit porous, graphitic carbon structures on cathode and anode materials are described in order to create high, stable cycling capacities for a variety of chemistries.

Figure 7:
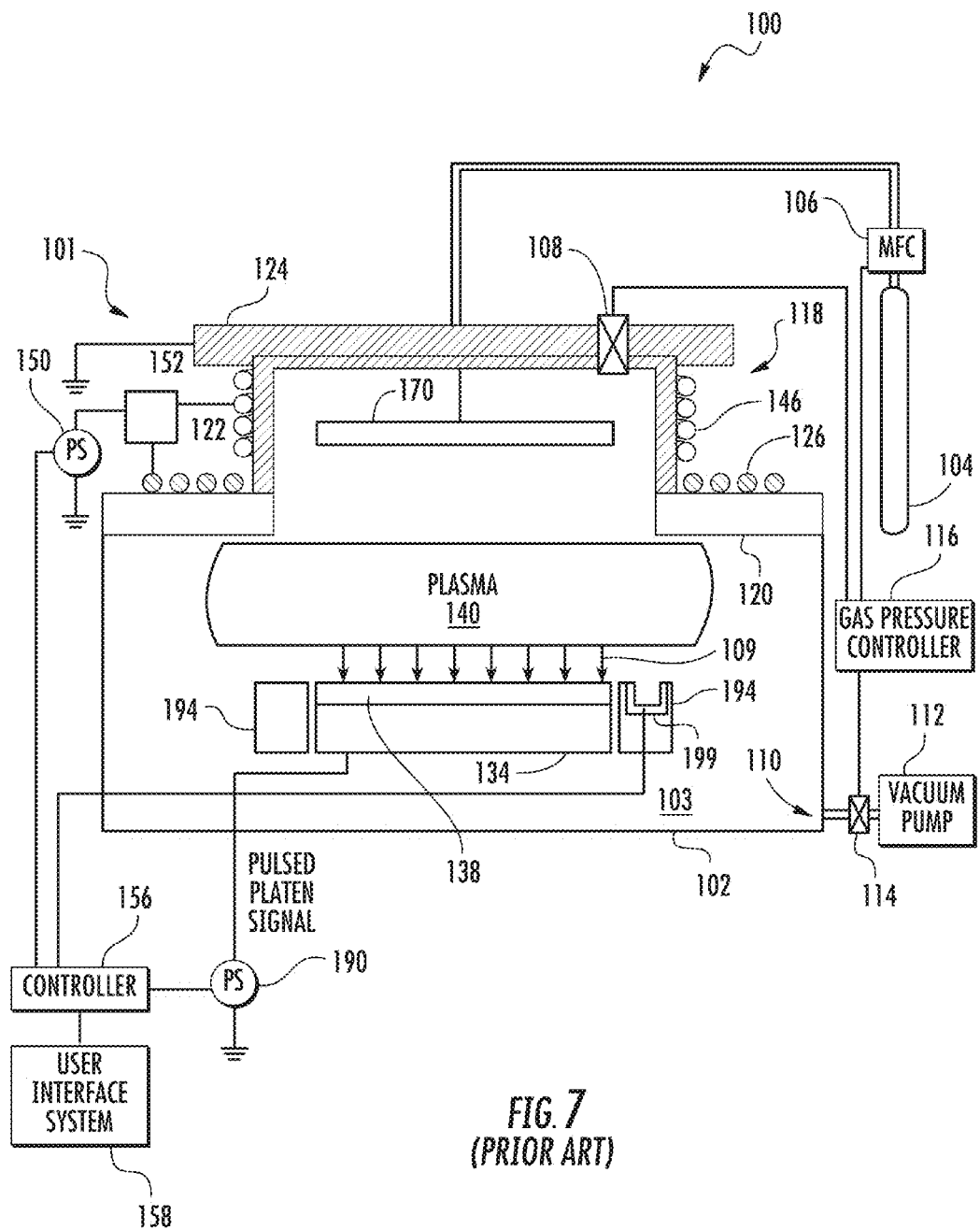
FIG. 7 is a plasma processing apparatus.

Turning to FIG. 7, a block diagram of one exemplary plasma processing apparatus 100 is illustrated. The plasma processing apparatus 100 includes a process chamber 102 defining an enclosed volume 103. A gas source 104 provides a primary gas to the enclosed volume 103 of the process chamber 102 through the mass flow controller 106. A gas baffle 170 may be positioned in the process chamber 102 to deflect the flow of gas from the gas source 104. A pressure gauge 108 measures the pressure inside the process chamber 102. A vacuum pump 112 evacuates exhausts from the process chamber 102 through an exhaust port 110. An exhaust valve 114 controls the exhaust conductance through the exhaust port 110.

The plasma processing apparatus 100 may further include a gas pressure controller 116 that is electrically connected to the mass flow controller 106, the pressure gauge 108, and the exhaust valve 114. The gas pressure controller 116 may be configured to maintain a desired pressure in the process chamber 102 by controlling either the exhaust conductance with the exhaust valve 114 or a process gas flow rate with the mass flow controller 106 in a feedback loop that is responsive to the pressure gauge 108.

The process chamber 102 may have a chamber top 118 that includes a first section 120 formed of a dielectric material that extends in a generally horizontal direction. The chamber top 118 also includes a second section 122 formed of a dielectric material that extends a height from the first section 120 in a generally vertical direction. The chamber top 118 further includes a lid 124 formed of an electrically and thermally conductive material that extends across the second section 122 in a horizontal direction.

The plasma processing apparatus further includes a source 101 configured to generate a plasma 140 within the process chamber 102. The source 101 may include a RF source 150 such as a power supply to supply RF power to either one or both of the planar antenna 126 and the helical antenna 146 to generate the plasma 140. The RF source 150 may be coupled to the antennas 126, 146 by an impedance matching network 152 that matches the output impedance of the RF source 150 to the impedance of the RF antennas 126, 146 in order to maximize the power transferred from the RF source 150 to the RF antennas 126, 146.

The plasma processing apparatus may also include a bias power supply 190 electrically coupled to the platen 134. The plasma doping system may further include a controller 156 and a user interface system 158. The controller 156 can be or include a general-purpose computer or network of general-purpose computers that may be programmed to perform desired input/output functions. The controller 156 may also include communication devices, data storage devices, and software. The user interface system 158 may include devices such as touch screens, keyboards, user pointing devices, displays, printers, etc. to allow a user to input commands and/or data and/or to monitor the plasma doping apparatus via the controller 156. A shield ring 194 may be disposed around the platen 134 to improve the uniformity of implanted ion distribution near the edge of the workpiece 138. One or more Faraday sensors such as Faraday cup 199 may also be positioned in the shield ring 194 to sense ion beam current.

In operation, the gas source 104 supplies a primary gas containing a desired dopant for introduction to the workpiece 138. The source 101 is configured to generate the plasma 140 within the process chamber 102. The source 101 may be controlled by the controller 156. To generate the plasma 140, the RF source 150 resonates RF currents in at least one of the RF antennas 126, 146 to produce an oscillating magnetic field. The oscillating magnetic field induces RF currents into the process chamber 102. The RF currents in the process chamber 102 excite and ionize the primary dopant gas to generate the plasma 140.

The bias power supply 190 provides a platen signal to bias the platen 134 and hence the workpiece 138 to accelerate ions 109 from the plasma 140 towards the workpiece 138. The ions 109 may be positively charged ions and hence the ON periods of the platen signal may be negative voltage pulses with respect to the process chamber 102 to attract the positively charged ions. In other embodiments, the ions 109 may be negatively changed ions and hence the ON periods of the platen signal may be positive voltage pulses to attract the negatively charged ions. In both cases, the platen 134 is biased to as to attract the desired ions toward the workpiece 138. The amplitude of the platen signal may be selected to provide a desired energy.

Figure 11:
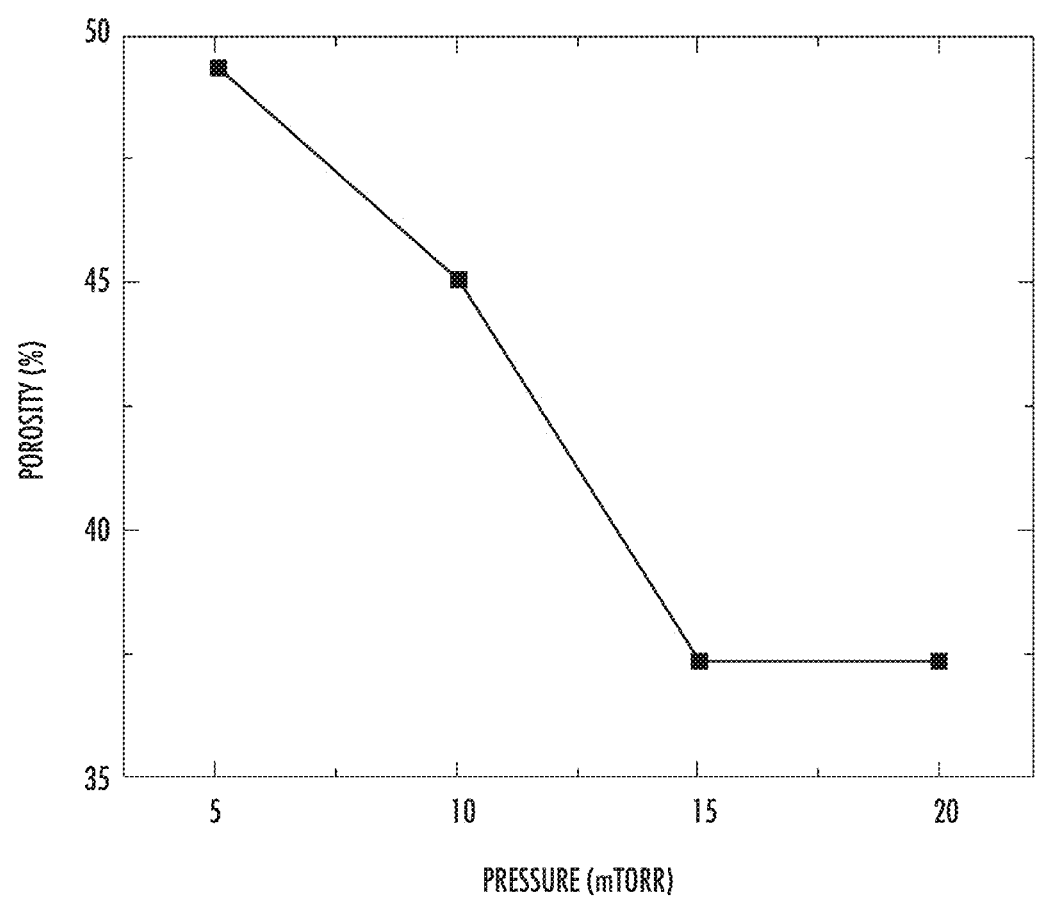
FIG. 11 shows a representative graph showing the relationship between chamber pressure and porosity.

To create porous carbon via deposition, a reaction gas, such as a carbon based molecule, including $C_xH_y$, $C_xB_yH_z$, $C_xP_yH_z$, $C_xN_yH_z$ or others, where x, y and z are positive integers, is introduced into the plasma processing chamber 102. The pressure within the chamber 102 is preferably maintained at very low pressure, such as between about 5 and 40 mTorr. In some embodiments, lower chamber pressure, such as pressures close to 5 mTorr, result in larger pore size and higher porosity. For example, a chamber pressure of about 5 mTorr may provide 50-60% porosity, while chamber pressure of 20 mTorr provides 30-40% porosity. FIG. 11 shows a representative relationship between chamber pressure and porosity. Furthermore, increasing the gas flux and implant energy may increase the deposition rate, resulting in thicker films.

Figure 12:
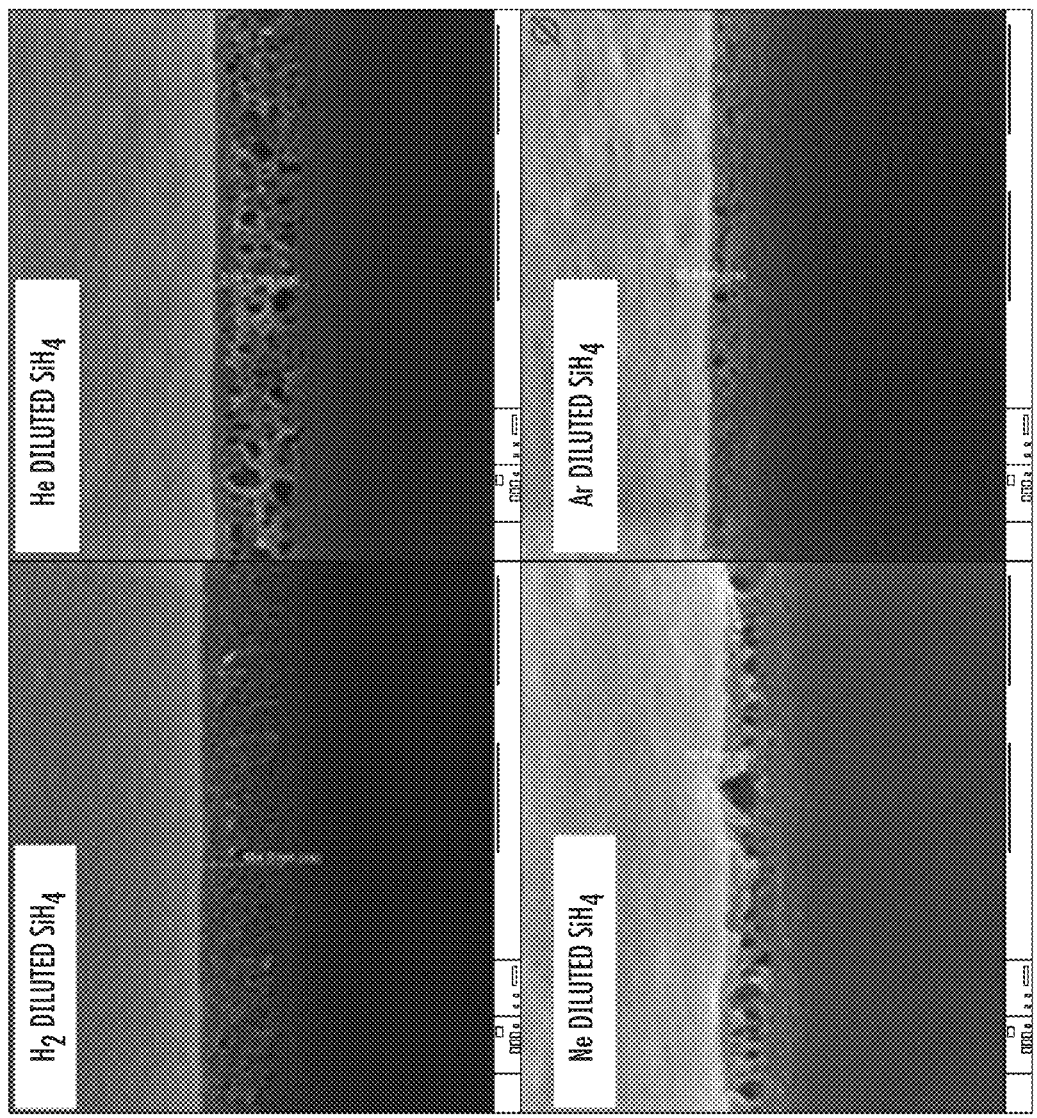
FIG. 12 shows the effect of different dilution gases on pore size.

In some embodiments, RF power of about 2 kW-5 kW is used to ionize the reaction gas. There are two characteristics of interest for carbon deposition: pore size and porosity. Pore size can be influenced by controlling the diluting gas type. In some embodiments, a diluting gas may include hydrogen, helium, neon or argon. Another method of varying pore size is by varying the amount of diluting gas, where a greater concentration of diluting gas results in larger pore size. In some embodiments, hydrogen and helium provide more homogeneous microstructures and thicker films than other diluting gases. FIG. 12 shows the effect of different dilution gases on pore size. The use of helium as a diluting gas creates much larger pores than hydrogen does. Similarly, the use of neon as a diluting gas creates larger, but less uniform, pores than helium or hydrogen. The use of argon as a diluting gas produces few, smaller pores.

Figure 13:
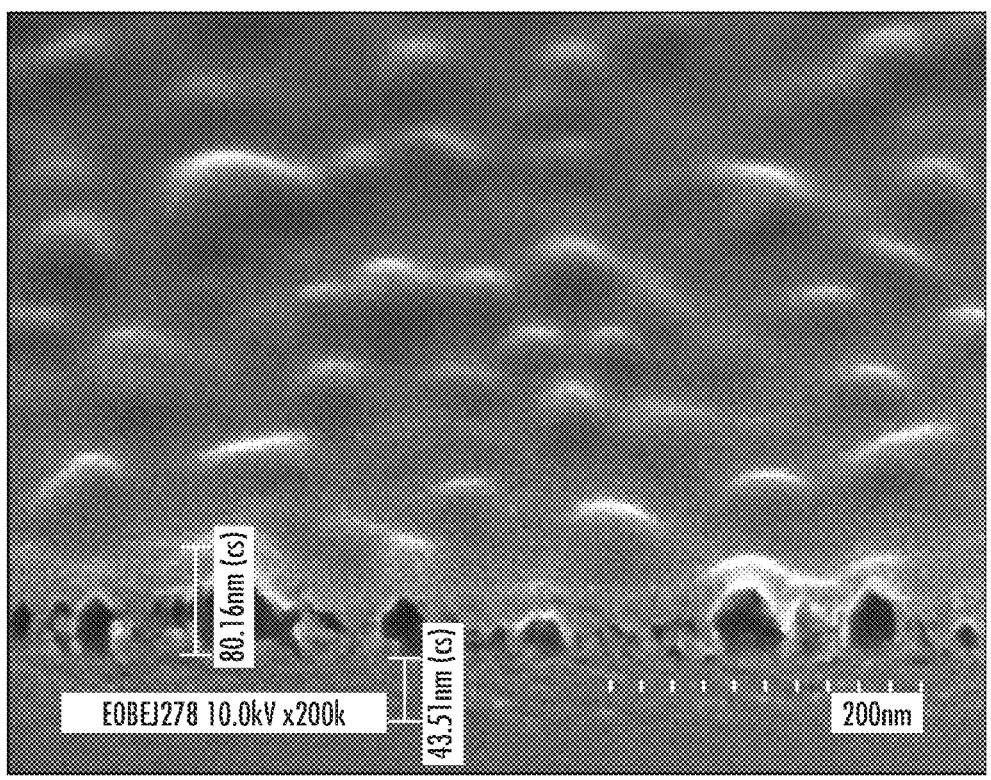
FIG. 13 shows a porous carbon created according to one embodiment.

In one particular embodiment, a chamber pressure of 10 mTorr is used. A gas comprising 50% $CH_4$, an implant energy of 3 kV and RF power of 3 kW is used to create a porous carbon layer, as shown in FIG. 13.

The pore size and porosity may also be controlled through adjustment of the angular distribution of the ions. For example, normal incidence ions may not create porous silicon, while ions with an incident angle larger than 5° may allow creation of porous silicon.

In another embodiment, plasma sheath modification may be used to change the incident angle of the ions and therefore, the pore size.

Figure 8:
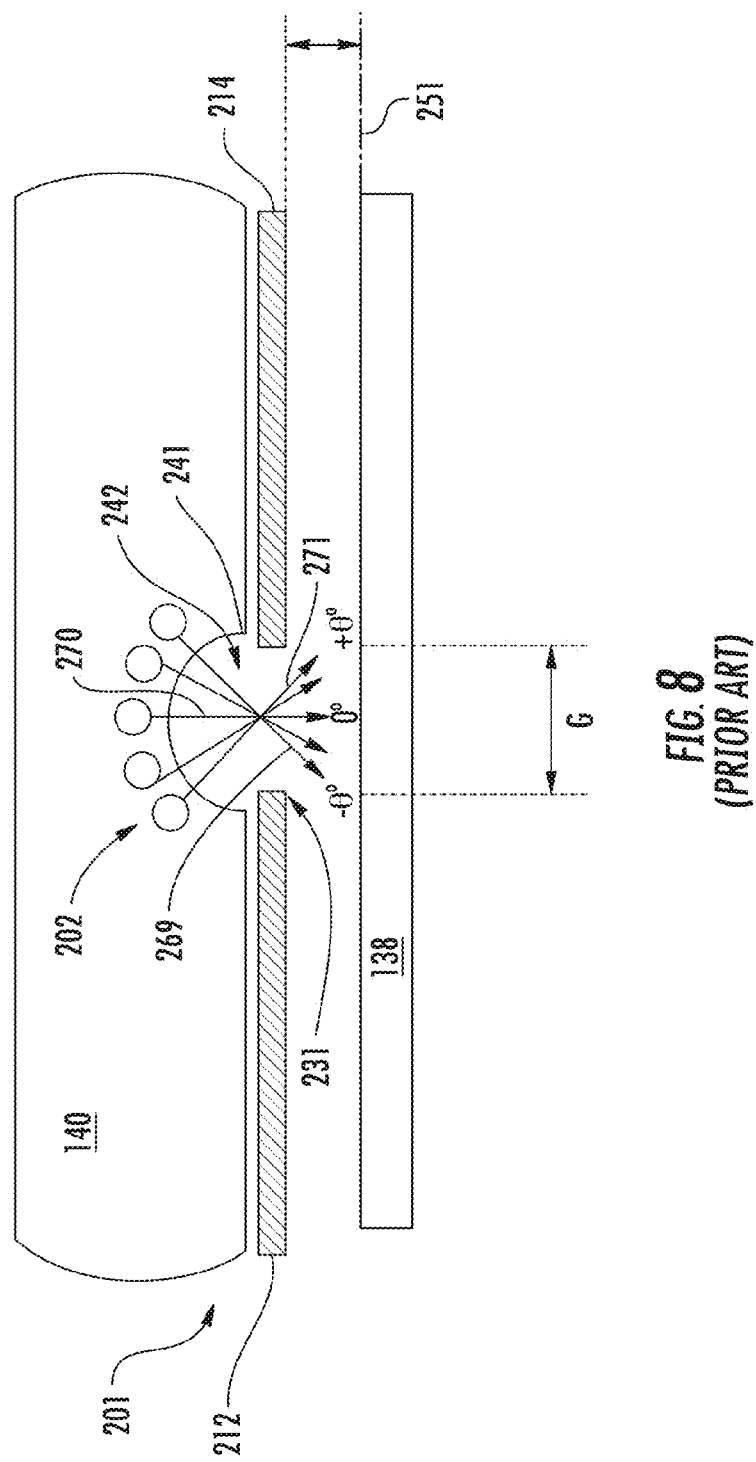
FIG. 8 is a cross-section view of an embodiment of sheath modification.

FIG. 8 is a block diagram of a plasma processing apparatus having a plasma sheath modifier. The plasma 140 is generated as is known in the art. This plasma 140 is generally a quasi-neutral collection of ions and electrons. The ions typically have a positive charge while the electrons have a negative charge. The plasma 140 may have an electric field of, for example, approximately 4 to 40 ev/cm in the bulk of the plasma 140. In a system containing the plasma 140, ions 202 from the plasma 140 are attracted toward a workpiece 138. These ions 202 may be attracted with sufficient energy to be implanted into the workpiece 138. The plasma 140 is bounded by a region proximate the workpiece 138 referred to as a plasma sheath 242. The plasma sheath 242 is a region that has fewer electrons than the plasma 140. Hence, the differences between the negative and positive charges cause a sheath potential in the plasma sheath 242. The light emission from this plasma sheath 242 is less intense than the plasma 140 because fewer electrons are present and, hence, few excitation-relaxation collisions occur. Thus, the plasma sheath 242 is sometimes referred to as "dark space."

The plasma sheath modifier 201 is configured to modify an electric field within the plasma sheath 242 to control a shape of a boundary 241 between the plasma 140 and the plasma sheath 242. Accordingly, ions 202 that are attracted from the plasma 140 across the plasma sheath 242 may strike the workpiece 138 at a large range of incident angles. This plasma sheath modifier 201 may be referred to as, for example, a focusing plate or sheath engineering plate.

In the embodiment of FIG. 8, the plasma sheath modifier 201 includes a pair of panels 212 and 214 defining an aperture 231 there between having a horizontal spacing (G). The panels 212 and 214 may be an insulator, semiconductor, or conductor. In other embodiments, the plasma sheath modifier 201 may include only one panel or more than two panels. The panels 212 and 214 may be a pair of sheets having a thin, flat shape. In other embodiments, the panels 212 and 214 may be other shapes such as tube-shaped, wedge-shaped, and/or have a beveled edge proximate the aperture 231. The panels 212 and 214 also may be positioned a vertical spacing (Z) above the plane 251 defined by the front surface of the workpiece 138. In one embodiment, the vertical spacing (Z) may be about 1.0 to 10.0 mm.

Ions 202 may be attracted from the plasma 140 across the plasma sheath 242 by different mechanisms. In one instance, the workpiece 138 is biased to attract ions 202 from the plasma 140 across the plasma sheath 242. In another instance, a plasma source that generates the plasma 140 and walls surrounding the plasma 140 are biased positively and the workpiece 138 may be grounded. The biasing may be pulsed in one particular embodiment. In yet another instance, electric or magnetic fields are used to attract ions 202 from the plasma 140 toward the workpiece 138.

Advantageously, the plasma sheath modifier 201 modifies the electric field within the plasma sheath 242 to control a shape of the boundary 241 between the plasma 140 and the plasma sheath 242. The boundary 241 between the plasma 140 and the plasma sheath 242 may have a convex shape relative to the plane 251 in one instance. When the workpiece 138 is biased, for example, the ions 202 are attracted across the plasma sheath 242 through the aperture 231 between the panels 212 and 214 at a large range of incident angles. For instance, ions 202 following trajectory path 271 may strike the workpiece 138 at an angle of $+\theta°$ relative to the plane 251. Ions 202 following trajectory path 270 may strike the workpiece 138 at about an angle of $0°$ relative to the same plane 251. Ions 202 following trajectory path 269 may strike the workpiece 138 an angle of $-\theta°$ relative to the plane 251. Accordingly, the range of incident angles may be between $+\theta°$ and $-\theta°$ centered about $0°$. In addition, some ion trajectories paths such as paths 269 and 271 may cross each other. Depending on a number of factors including, but not limited to, the horizontal spacing (G) between the panels 212 and 214, the vertical spacing (Z) of the panels 212 and 214 above the plane 251, the dielectric constant of the panels 212 and 214, or other process parameters of the plasma 140, the range of incident angles ($\theta$) may be between $+60°$ and $-60°$ centered about $0°$.

Through the use of plasma sheath modification, porous carbon can be deposited. In this embodiment, $CH_4$, diluted with hydrogen, helium, neon or argon may be used as a precursor gas. As described above, sheath modification may be used to control the pore size and porosity of the porous carbon. In some embodiments, the pore size and porosity vary with the width of aperture 231 (see FIG. 8). In some embodiments, an increase in the width of aperture 231 results in smaller pore size and higher porosity. In some embodiments, apertures widths between 0.5 cm and 2.0 cm are used. Changing the aperture width necessarily changes the incident angular distribution. In addition, the effective plasma interaction density changes.

Since the width of aperture 231 is known to affect the range of incident angles ($\theta$), it may be that other parameters, which also affect incident angle, may also affect porosity and pore size. For example, the horizontal spacing (G) of aperture 231, the vertical spacing (Z) of the panels 212 and 214 above the plane 251, the dielectric constant of the panels 212 and 214, or other process parameters of the plasma 140, such as chamber pressure, gas flux and RF power may also be used to modify the pore size and porosity of the porous carbon. In addition, a bimodal incident angle distribution, created by varying the heights of panels 212 and 214 relative to each other, or a wide incident angle distribution, not centered at $0°$, may also be used to control the grain size and orientation, and may also affect the porosity level.

In some embodiments, a large external surface area is beneficial. A large external surface area improves the performance of thin film cathodes by enhancing lithium diffusion. This allows faster charging and discharging of the battery. By definition, porous carbon has a large internal surface area, due to the large number of pores. To increase the external surface area, a short plasma etch may be performed following the deposition of the porous material. In some embodiments, the porous material may be etched using a low energy plasma treatment, such as 1 kV, with dose ranging from 1E16 to 3E16 atoms per square centimeter implant. The etching gas could be $H_2$, $Cl_2$, $BCl_3$, HBr, $CF_4$, $CHF_3$, and other halogen-based compounds. In some embodiments, the etching gas could also be a mixture of the above gases and argon and/or nitrogen to improve etching rate and tailor etching profile.

In one embodiment, in order to create a hydrophilic surface having a large surface area, a mixture of $SiCl_4$ and $Cl_2$ plasmas is used. Chlorine is a commonly used etchant and serves to quickly remove the top layer of the porous carbon to expose the internal pores. The addition of $SiCl_4$ to the etching chemistry serves to produce $SiCl_x$ species on the porous surfaces. Upon completion of the etching step, the substrate wafer can then be immersed in a heated water bath that is slightly basic (such as pH>8.0). This step would help hydrolyze the $SiCl_x$ on the surface, making the pores superhydrophilic. Silicon tetrachloride is in fact a byproduct of the Si etching by chlorine, but its amount may not be sufficient to produce enough $SiCl_x$, thus requiring the addition of $SiCl_4$.

A bias should be applied to the substrate in the pore-opening process described herein and it may be in the range of 1-2 kV. Compared to a normal $Cl_2$ etching process, this bias needs to be slightly higher, such as between 2-4 kV, which serves to help the $SiCl_x$ and/or Cl ions penetrate into the pores and to enhance ion implantation as compared to etching. It should be low enough, however, to not cause the chlorine functional groups to be buried deep under the substrate surface. In addition, lower process pressure, such as around 5 mTorr, is required to reduce collisions within the sheath and improve the probability of generating high concentrations of $SiCl_x$ functionalities on the surface.

The significance of this capability is a structure with high surface kinetics, as well as maintaining a hydrophilic surface. Increasing the surface area drastically improves the performance of thin film electrodes by providing more active area for electrochemical reactions to take place. This may allow for faster charging and discharging of the battery. Hydrophilic properties may be desirable in order to provide more complete wetting of the electrolyte on the electrode. This may translate into more uniform lithium intercalation and increased rate capabilities.

It is known that carbon atoms can be coupled using $sp^2$ or $sp^3$ bonds. The $sp^3$ bond may be less desirable, as this bond is found in diamond, which may be insulating. In contrast, the $sp^2$ bonds are those found in graphite and are more conductive. Controlling the ratio of these two types of carbon bonds may be important to the creation of a high performing porous carbon layer. This ratio may be controlled through various plasma parameters including $CH_4$ gas concentration, power energy, temperature, and pressure. For example, a high $CH_4$ concentration and chamber pressure may be advantageous in order to promote a strong $sp^2$ deposition. In addition, carbon ions may not be needed for $sp^2$ deposition, so the RF plasma may be operated at lower power modes, such as 300 W. In addition low implant energy and low temperature may be beneficial in preventing the formation of the $sp^3$ bonds.

Figure 9A:
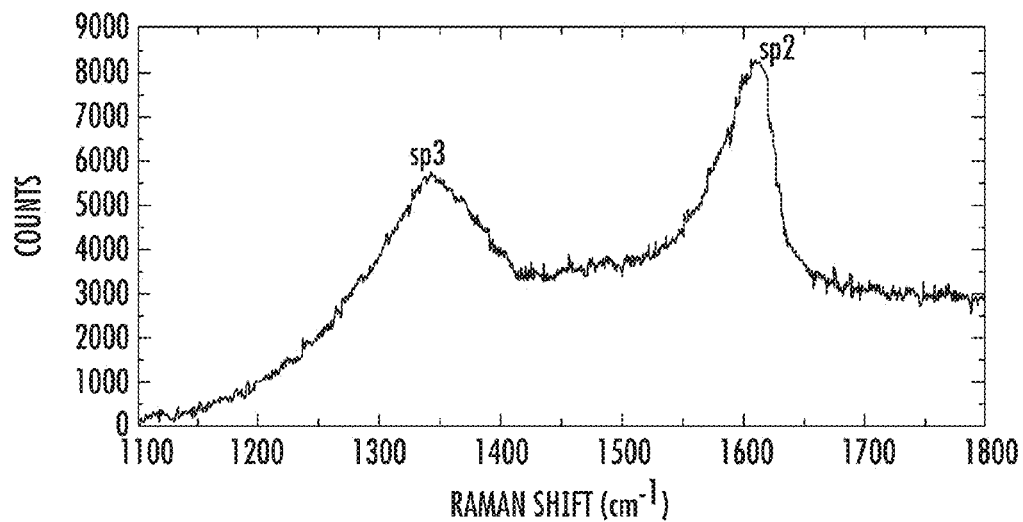
FIGS. 9A-B show the difference in Raman structure between high implant energy and lower implant energy.
Figure 9B:
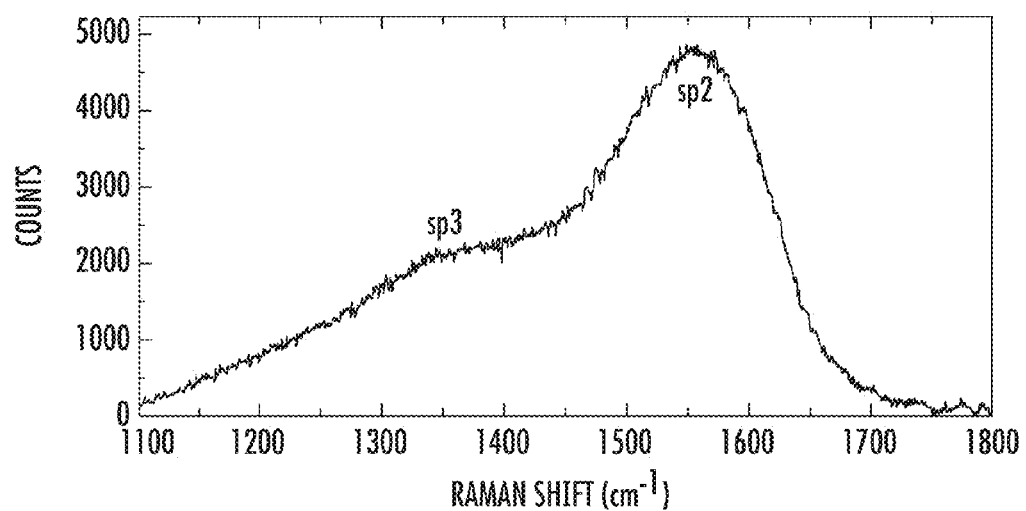

FIG. 9 shows a Raman spectrum of carbon layers deposited at $250°$ C. using two different implant energies. FIG. 9A shows the Raman spectrum when the platen is biased at greater than 200V. Note a relatively high amount of $sp^3$ bonds are created. In contrast, FIG. 9B shows the Raman spectrum when the platen is biased at between 50V and 200V. Note the reduction in the amount of $sp^3$ bonds.

In other embodiments, porous carbon with $sp^2$ and doped $sp^3$ may be used to improve the performance of the porous layer.

In addition, after the deposition of the porous carbon and optional etch process, the material may be subjected to a separate hydrophilic treatment, such as an oxygen (with or without argon) treatment. This improves the interaction between the porous layer and the electrode.

Figure 10:
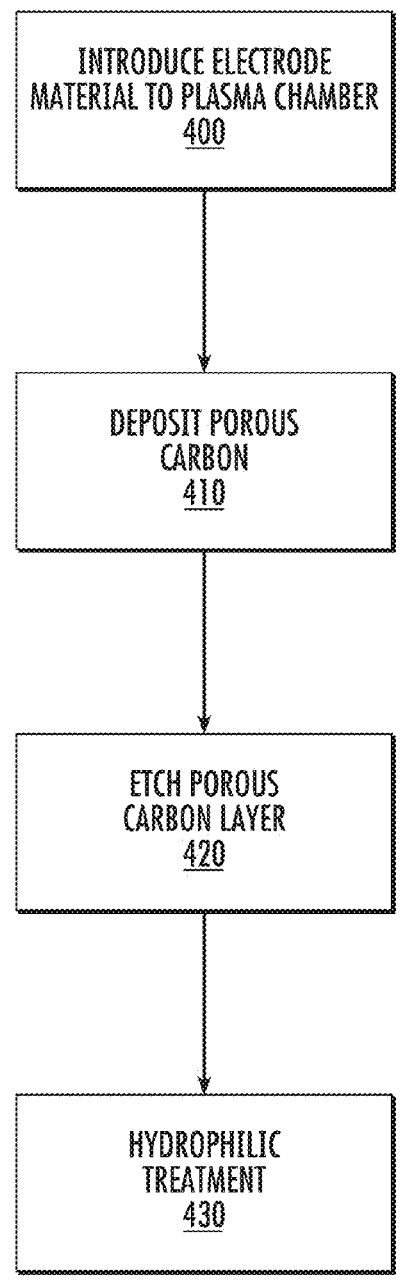
FIG. 10 shows a process of creating a porous carbon layer on a cathode or anode material.

FIG. 10 shows a flowchart demonstrating the formation of an electrode in accordance with the present disclosure. In step 400, the electrode material is introduced to the plasma chamber. In some embodiments, the electrode may be a cathode material, which may comprise a layer of aluminum with a lithium based material layers on top of the aluminum. In other embodiments, the electrode may be an anode material, such as silicon. In step 410, the porous carbon is then deposited on the electrode material as described above. The particular parameters used for the deposition, such as diluting gas species and concentration, gas pressure, implant angle, implant energy, RF power level and temperature, may vary as required. After a sufficient amount of carbon has been deposited, the porous carbon may be optionally etched, as shown in step 420. This etch may be used to increase external surface area of the porous material. Optionally, the porous carbon may be exposed to a hydrophilic treatment, as shown in step 430. In some embodiments, the etching process, shown in step 420, may also serve to make the porous carbon more hydrophilic, thereby eliminating the need for a separate hydrophilic treatment.

In another embodiment, a lithium ion battery is produced using one or more electrodes treated with porous carbon as described above. For example, a high performance battery may be produced using a traditional anode and electrolyte with a cathode treated with porous carbon as described herein. In another embodiment, a high performance battery may be produced using an anode and cathode treated with porous carbon. In yet another embodiment, a high performance battery may be created using a traditional cathode and electrolyte, with an anode treated with porous carbon as described herein.

The method disclosed herein is advantageous over prior processes. Competing approaches include thermal decomposition of pyrene, hydrothermal decomposition of ascorbic acid, citric acid based sol-gel processing, modified mechanical activation of acetylene black, and spray pyrolysis assisted with planetary ball-milling. These techniques often require operating temperatures over 700° C. and result in high wt % C. This, in turn, reduces the energy density of the cathode by adding excess mass. The proposed process may operate at room temperature, which prevents the oxidation of metals in the cathode, such as Fe, Co, and Mn.

The proposed process involves a gas-solid reaction with an applied bias, which not only allows for uniform coating of the surface, but also offers the advantage of penetrating into cathode particles to coat the inner surface area. This type of process would also require less wt % C in the electrode than typical solution based processes, resulting in higher energy density. Using implantation enables better adhesion and stability of the implanted/deposited layer during cycling.

Another advantage of the proposed technology is control over the $sp^2/sp^3$ ratio for the carbon layer. The plasma parameters can be adjusted to produce high $sp^2/sp^3$ ratios to improve electrical conductivity and enhance electrochemical performance.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of treating an electrode for a battery, comprising:
introducing a reaction gas, comprising a carbon-based molecule, and a diluting gas, selected from the group consisting of hydrogen, helium, neon, argon, and a combination of hydrogen and helium, into a chamber;
creating a plasma containing carbon from said reaction gas and said diluting gas in said chamber; and
depositing a layer of porous carbon onto said electrode by attracting said plasma toward said electrode.

2. The method of claim 1, wherein said plasma is created using a RF power level of less than 300 W.

3. The method of claim 1, wherein said electrode is disposed on a platen and said platen is biased at less than 200V to deposit said layer of porous carbon on said electrode.

4. The method of claim 1, further comprising performing an etching process on said electrode after said depositing step is completed so as to expose internal pores of said layer of porous carbon.

5. The method of claim 4, wherein said etching process is performed using an etching gas selected from the group consisting of hydrogen, chlorine, and a halogen based compound.

6. The method of claim 1, further comprising performing a hydrophilic treatment on said electrode.

7. The method of claim 4, further comprising performing a hydrophilic treatment on said electrode.

8. The method of claim 1, wherein said electrode comprises a cathode.

9. The method of claim 1, wherein said electrode comprises an anode.

10. The method of claim 1, wherein said electrode is disposed on a platen, and said platen is biased at a predetermined voltage to attract said plasma.

11. The method of claim 10, wherein said platen is biased at a voltage less than 200 V.

12. A battery comprising:
an anode;
an electrolyte; and
a cathode, where at least one of said anode and said cathode is treated according to the method of claim 1.

13. The battery of claim 12, wherein said cathode comprises a material selected from the group consisting of $LiCoO_2$, $LiMn_2O_4$, and $LiFePO_4$.

14. The method of claim 1, further comprising using a plasma sheath modifier so that carbon is attracted to said electrode at a plurality of incident angles.

15. The method of claim 14, wherein said plasma sheath modifier comprises a plurality of panels disposed between said plasma and said electrode, said panels defining an aperture therebetween, a width of said aperture being between 0.5 cm and 2.0 cm.

16. The method of claim 1, wherein a concentration of said diluent gas, a chamber pressure, an RF power level and an implant energy are selected so as to determine a porosity and pore size of said deposited layer of porous carbon.

17. The method of claim 1, wherein said carbon-based molecule is selected from the group consisting of $C_xH_y$, $C_xB_yH_z$, $C_xP_yH_z$, and $C_xN_yH_z$, where x, y and z are positive integers.

18. The battery of claim 13, wherein said cathode is treated according to the method of claim 1.

* * * * *